United States Patent [19]

Das Gupta

[11] 4,432,094

[45] Feb. 14, 1984

[54] METHOD FOR RECOGNIZING DIGITAL INFORMATION TRANSMITTED IN A MOBILE RADIO COMMUNICATION SYSTEM

[75] Inventor: Probodh Das Gupta, Germering, Fed. Rep. of Germany

[73] Assignee: Siemens Aktiengesellschaft, Berlin & Munich, Fed. Rep. of Germany

[21] Appl. No.: 296,867

[22] Filed: Aug. 27, 1981

[30] Foreign Application Priority Data

Sep. 29, 1980 [DE] Fed. Rep. of Germany ....... 3036614

[51] Int. Cl.³ .......................................... H04B 17/00
[52] U.S. Cl. ..................................... 375/94; 375/102; 371/36
[58] Field of Search .................. 375/78, 80, 113, 118, 375/94, 95, 102; 455/50, 63, 139, 146, 165, 207, 205, 313, 314, 133, 135; 371/36, 64, 61; 328/162, 164, 165

[56] References Cited

U.S. PATENT DOCUMENTS

| | | | |
|---|---|---|---|
| 3,978,408 | 8/1976 | Das Gupta et al. | 455/133 |
| 4,063,174 | 12/1977 | Das Gupta | 455/135 |
| 4,099,023 | 7/1978 | Gerges et al. | 375/118 |
| 4,302,831 | 11/1981 | Zemanek | 375/118 |

FOREIGN PATENT DOCUMENTS 1804719 5/1970 Fed. Rep. of Germany.

Primary Examiner—Benedict V. Safourek
Assistant Examiner—Stephen Chin

[57] ABSTRACT

In a method for recognizing digital information in a digital information transmission, particularly in a mobile radio communications system, a sampling pulse is derived from the digital information available at the receiver, preferably derived with a whole multiple of the information clock frequency. A sampling time is located in the respective area of an information element during its suspected quasi-stationary state. At least one further sampling pulse is derived from the digital information at a further, whole multiple of the information clock frequency. The edges of the further sampling pulse are placed at a corresponding number of sampling times within a further extended sampling range of the pulse representing the information element. A respective comparison of a first sampling result is undertaken with one or more following sampling results for each individual information. A majority decision is then performed on the basis of the existing sampling results in order to determine the respective sampling mode which exhibits the smallest perceived information bit error rate.

4 Claims, 2 Drawing Figures

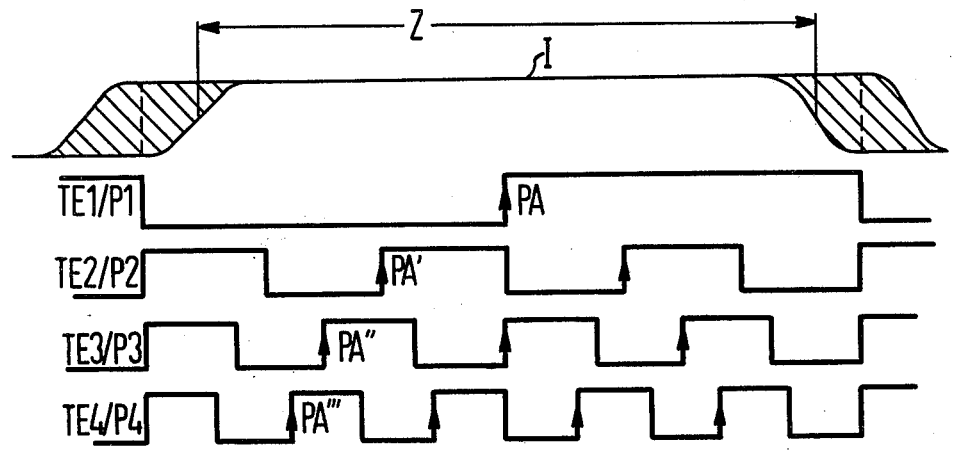
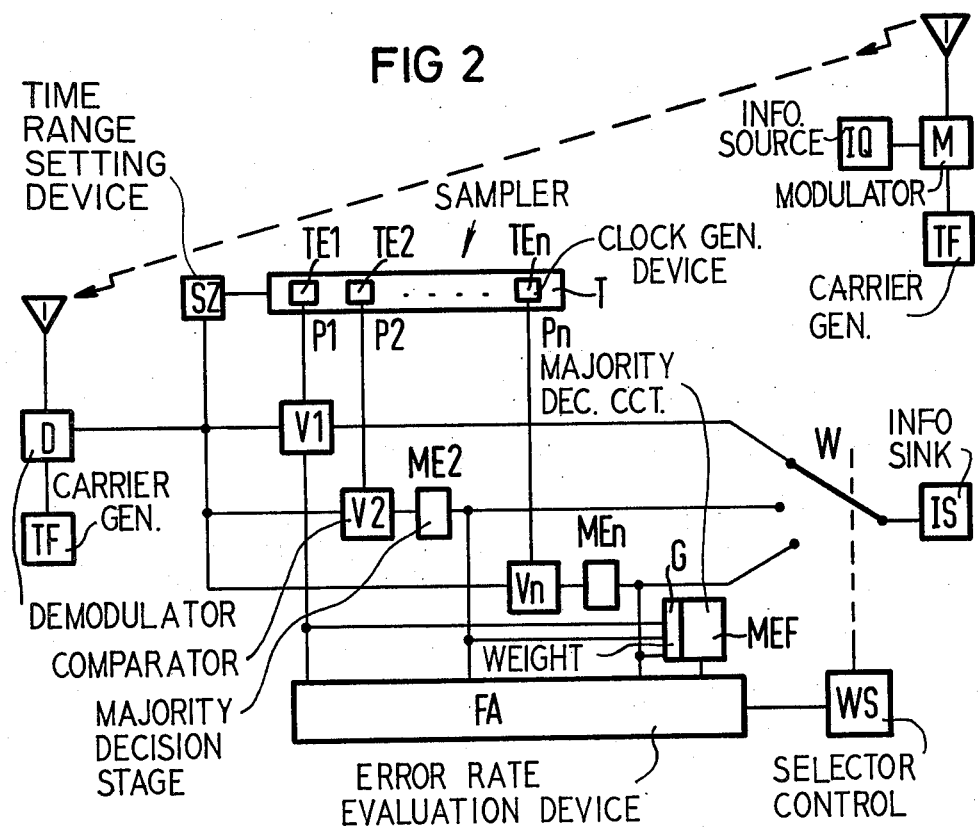

METHOD FOR RECOGNIZING DIGITAL INFORMATION TRANSMITTED IN A MOBILE RADIO COMMUNICATION SYSTEM

CROSS REFERENCE TO RELATED APPLICATIONS

This application is related to my two co-pending applications, Ser. No. 296,821 and Ser. No. 296,972, both filed Aug. 27, 1981.

BACKGROUND OF THE INVENTION

1. Field of the Invention

The present invention relates to a method for recognizing digital information in a digital transmission, particularly an information transmission in mobile radio communications systems, and to a circuit arrangement for implementing the method.

2. Description of the Prior Art

Speech, data and image information are forms of information which are to be transmitted in known, wirebound communications systems and in future mobile radio communications systems. Given a transmission of information, particularly digitized information, in a mobile radio communications system, a problem arises in that, due to so-called multi-path propagation on the radio path, fading arises which can cause information bit errors during transmission.

Methods are known by means of which a sampling pulse is derived at the respective receiver from the received digital information, the sampling pulse being employed for placing a sampling time into the respective area of an information element in which the pulse to be sampled, and which represents the information element, assumes its suspected, quasi-stationary state, cf. for example, the German allowed and published application 1,804,719. These known methods, however, have the disadvantage that in such cases in which pulses representing information elements are distorted in amplitude and/or phase due to disruptive influences, a bit error can be simulated precisely at the time of decision, although the appertaining pulse can be error-free when viewed overall.

SUMMARY OF THE INVENTION

The object of the invention is to provide a method and an apparatus for implementing the method for recognizing digital information in a digital information transmission, particularly an information transmission in mobile radio communications systems, in which a sampling pulse from the digital information available at the receiver is preferably derived with a whole multiple of the information clock frequency and in which a sampling time is placed into the respective area of an information element in which the pulse to be sampled, and which represents the information content of the information element, assumes a suspected, quasi-stationary state, the method being particularly characterized in that at least one further sampling pulse is derived from the digital information available at the receiver at a further whole multiple of the information clock frequency and that the edges of the sampling pulse are located at a corresponding number of sampling times within a further extended sampling range of the pulse representing the information element. A respective comparison of a first sampling result with one or more following sampling results is executed for an individual information element. A majority decision is undertaken on the basis of the existing sampling results, by means of which that respective sampling mode is applied which exhibits the smallest perceived information error rate.

The present invention offers the advantage that a multiple sampling of the information elements can be executed in a simple manner and that pulses which are error-free overall per se, but which represent distorted information elements, can be accepted as error-free, so that the information transmission experiences a higher utilization effect.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 is a timing diagram of an information pulse with various sampling pulses; and FIG. 2 is a block circuit diagram of a preferred exemplary embodiment of a circuit arrangement for implementing the method of the present invention.

DESCRIPTION OF THE PREFERRED EMBODIMENTS

Provided in the receiver for implementing the method are a demodulator D, a carrier frequency generator TF, a plurality of non-correlated clock generating devices TE1, TE2 . . . TEn, a plurality of majority decision stages ME2 . . . MEn, an error rate evaluation device FA, a majority decision stage MEF for evaluating the mean error rate, a selector device W, a selector control device WS, a device SZ for generating a setting signal for a time range setting, and an information sink IS. The transmitter may comprise devices which are well known per se, here illustrated only for understanding of the interrelationships, such as an information source IQ, a carrier frequency generator TF, and a modulator M, all of the above being set forth in FIG. 2.

According to the invention, and for an optimum sampling of a pulse representing an information element, as shown in FIG. 1, in addition to the sampling pulse which is derived from the incoming digital information and which is generated in a first clock generating device TE1, further sampling pulses having respective frequencies higher in comparison to the frequency of the first clock generating device TE1 are generated by further clock generating devices TE2 . . . TEn. Various sampling modes for sampling the pulse representing the information element can be employed with the various sampling pulses made available.

It proceeds from FIG. 1 that the pulse I representing the information element can be sampled in sampling areas having various widths by the various sampling pulses P1, P2 . . . Pn. To that end, a comparison of a first sampling result to one or more following sampling results is respectively carried out for an individual information element. On the basis of a majority decision concerning the existing sampling results, that respective sampling mode is employed which exhibits the smallest perceived information error rate.

To that end, a plurality of comparators V1, V2 . . . Vn are individually assigned to each of the respective clock generating devices TE1, TE2 . . . TEn and are connected to a sampling device T which contains the different clock generating devices. With the assistance of these comparators, the sampling results are derived from a respective multiple sampling of the single, individual information element. Individual, respective majority decision stages ME2 ... MEn are connected to the comparators V2 ... Vn, the majority decision stages selecting that sampling result, in a manner known per se, for example, by a so-called majority logic circuit, as the "correct" sampling result which has predominantly occurred in the majority of the individual sampling results for a single information element. In that instance in which no majority decision can be made, the signal output of the appertaining majority decision stage is switched off for the appertaining evaluation time interval, for example, by means of a tri-state logic device.

All sampling results from the individual comparators V1, V2 ... Vn determined in that manner are supplied to the error rate evaluation device FA. In the error rate evaluation device FA, the sampling results from the comparators are processed together or, respectively, edited in a known manner. Signal inputs of the majority decision stage MEF for evaluating a mean error rate are connected by way of weighting stages G switched on as needed to the signal inputs of the error rate evaluation device FA. With this device, namely the majority decision stage MEF, which can likewise again contain a so-called majority logic circuit, a setting signal for a selector drive WS is obtained, on the basis of which the selector drive WS can set the selector device W to the sampling mode, namely to the sampling pulse, for example the pulse P2, which exhibits the smallest perceived information bit error rate. The information sink IS of the information receiver is connected to the signal output of the selector device W. By means of a time range setting device SZ which can influence the sampling device T, the time range Z in which the sampling pulse edges lie within the pulse representing the information element can be set by a phase control. This can be done either by a setting to be undertaken only once or by continuously control setting which is influenced by the mean error rate.

A method for the recognition of digital information which makes the recognition of the digital information less sensitive to disruptions has been provided by the present method and with a circuit arrangement suitable for implementing the method, for which the circuit arrangement according to FIG. 2 represents a preferred exemplary embodiment.

Although I have described my invention by reference to particular exemplary embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for recognizing digital information of a digital information transmission, comprising the steps of:

first sampling, at a whole multiple of the information clock frequency, a pulse in a respective area of the pulse representing an information element in which the pulse assumes its suspected, quasi-stationary state;

then sampling the pulse of the information element at least one more time at a further multiple of the information clock frequency a corresponding number of sampling times within a further extended sampling range of the pulse representing the information element; and performing a majority decision with the sampling results to determine the sampling mode which exhibits the smallest perceived information error rate.

2. The method of claim 1, and comprising the further steps of:

selecting an optimum sampling mode by setting a time range in which one edge of the pulse representing the current information element occurs within the time range; and setting the magnitude of the time range as a criterion for the selection.

3. The method of claim 1, and further comprising the steps of:

selecting an optimum sampling mode by setting, on an analog basis, a time range in which no edge of the pulse representing the current information element occurs within the time range; and utilizing the required setting magnitude for setting the time range as a criterion for the selection.

4. A circuit arrangement for recognizing digital information in a clocked carrier frequency modulated information transmission, comprising:

an antenna for receiving the information transmission;

a carrier frequency generator;

a demodulator connected to said carrier frequency generator and to said antenna for demodulating the received transmission;

a sampling device including a plurality of clock generating devices, said sampling circuit connected to said demodulator;

a plurality of comparators each connected to said demodulator and each connected to a respective clock generating device for comparing the demodulated signal with the sampling signal;

a plurality of majority decision stages each connected to a respective comparator with the exception of the first of the plurality of comparators for performing majority decisions with respect to the comparison results;

an error rate evaluation device connected to said first of said plurality of comparators and to each of said majority decision devices for evaluating the mean error rate;

a mean error rate majority decision circuit connected to the first of said comparators, to each of said majority decision devices and to said error rate evaluation device, including a weighting stage for weighting the signals from said first comparator and said majority decision stages and providing a majority decision signal indicating the mean error rate to said error rate evaluation device;

an information sink;

a selector switch connected to said information sink and selectively connectible to the first of said comparators and to each of said majority decision devices; and a selector control device connected to said selector switch and operable to connect said information sink, via said selector switch, to the first comparator or majority decision stage which is providing the smallest perceived error rate in response to said error rate evaluation device.

* * * * *